United States Patent

Breng et al.

[11] Patent Number: 6,119,517
[45] Date of Patent: Sep. 19, 2000

[54] MICRO-MECHANICAL RATE-OF-ROTATION SENSOR WITH COUPLED STRUCTURE

[75] Inventors: Uwe Breng, Gundelfingen; Bruno Ryrko, Reute; Steffen Zimmermann, Freiburg, all of Germany

[73] Assignee: Litef GmbH, Germany

[21] Appl. No.: 09/352,258

[22] Filed: Jul. 13, 1999

[30] Foreign Application Priority Data

Jul. 14, 1998 [DE] Germany ............... 198 31 594

[51] Int. Cl.$^7$ ................................ G01C 19/00
[52] U.S. Cl. .................................... 73/504.12
[58] Field of Search .............. 73/504.12, 504.02

[56] References Cited

U.S. PATENT DOCUMENTS 5,959,206  9/1999  Ryrko et al. ............... 73/504.12

*Primary Examiner*—Richard A. Moller
*Attorney, Agent, or Firm*—Elliot N. Kramsky

[57] ABSTRACT

Strictly out-of-phase stimulation of the two oscillators of a micro-mechanical rate-of-rotation sensor based on the Coriolis principle, having two-plate like oscillators arranged in layers one above another in two parallel planes and capable of being stimulated to oscillate perpendicular to the planes by means of an electrostatic drive, is achieved by the oscillators each being connected via at least one spring to a couple element formed, in each case, in the same wafer layer. The couple elements are mirror-symmetrically configured with respect to a mid-plane between the oscillators and connected to each other by a coupling web arranged therebetween to form a couple structure for the oscillators.

4 Claims, 5 Drawing Sheets

6,119,517

1

MICRO-MECHANICAL RATE-OF-ROTATION SENSOR WITH COUPLED STRUCTURE

BACKGROUND

1. Field of the Invention

The invention relates to micro-mechanical rate-of-rotation sensors based on the Coriolis principle. In particular, the present invention pertains to sensors of the type that employ two plate-like oscillators, one above the other in parallel planes, each being capable of being stimulated to oscillate perpendicular to its plane by means of an electrostatic drive.

2. Description of the Prior Art

A type of rate-of-rotation sensor includes two plate-like oscillators, each formed in at least one wafer layer. The wafer layers are arranged one above the other in parallel planes and are stimulated to oscillate perpendicular to the planes in response to an electrostatic drive. Such a sensor is described in International patent application WO 96/38710 which is hereby incorporated by reference. A perspective view of the device presented in FIG. 6 (corresponding to FIG. 9 of the reference) clearly illustrates the prior art. Referring to the publication, such a rate-of-rotation sensor comprises two oscillators in alignment arranged one above another in layers. The upper oscillator 60 is visible in FIG. 6. Such oscillator 60 and a corresponding lower, mirror image, symmetrically arranged oscillator (not visible) is (in each case) articulated via a first spring 70 to an electrostatic plate-like drive 61, which, in turn, is connected via a second spring 69 to a plate-like support 62 through which the rate of rotation is read out. The whole arrangement, connected in a row, comprising the oscillator 60, the drive 61 and the support 62, is held in a frame 68 via a crossed-spring articulation 63, 63'. It can be seen from FIG. 6 that each oscillator element 60, 61, 62, including the associated frame 68, is formed in two layers (i.e. from a composite wafer) with the interposition of a thin insulation layer (not illustrated), of, for example, SiO2.

The upper two-layer frame 68 and the lower two-layer frame 68' thereby enclose the entire oscillator structure which is formed of four wafer layers. It is possible to supply different potentials via external connections 64 to 67, connected in one piece to the frame. Top and bottom wafers, provided with lead-throughs for electrostatic (capacitive) stimulation, signal read-out and resetting (in a closed-loop system) are not illustrated in FIG. 6; rather, reference is made in this regard to FIG. 2 of the cited reference. The advantage of such a two-layer oscillator structure as illustrated in FIG. 6 is, inter alia, that interference with the measured values resulting from reaction forces due to oscillator movements is avoided despite the fact that comparatively large oscillation amplitudes of the oscillator 60 and the mirror-image symmetrically arranged oscillator (not visible in FIG. 6) can be obtained with small capacitor drive gaps in the region of the drive 61. The rate of rotation is capacitively read out through area electrodes (not shown) at the upper side of the support 62 and at the lower side of the mirror-image lower support 62' (not visible in FIG. 6) employing corresponding mating electrodes on the top and bottom wafers (not shown). The illustrated crossed-spring articulation 63, 63' is advantageous in that rotational movements caused by Coriolis forces and the capacitance changes that follow are readily transmitted. On the other hand, horizontal and vertical oscillations are suppressed in this region.

In this known oscillator structure, electrostatic stimulation is made considerably simpler—as mentioned—due to the

2 narrow drive gap in the region of the drive 61, in spite of the relatively large oscillation amplitudes. This can be implemented with comparatively low drive voltages (e.g., a few volts).

While simple oscillator systems are disadvantageous in that the reaction forces are dissipated into the mounting surface of the rate-of-rotation sensor, changes to the stiffness having reaction effects on the measuring system, with consequent zero point and scaling factor non-repeatability, a double oscillator has the advantage that its masses oscillate in opposite directions and thereby generate no net external reaction forces. However, it has been shown that oscillator frequencies differ as a result of oscillator mass and spring production tolerances. This results in problems for the drive electronics. The oscillators must be operated at an intermediate frequency, their amplitudes lowered in response to oscillator quality, with their phases incapable of being uniquely specified. Electronic solutions, by means of which both amplitudes and the mutual phases can be recorded, are complicated and susceptible to faults.

SUMMARY AND OBJECTS OF THE INVENTION

It is therefore an object of the present invention to provide a rate-of-rotation sensor of the type that includes two oscillators, each formed in at least one wafer layer, with the layers being arranged one above the other in parallel planes and stimulated to oscillate perpendicular to the planes in response to an electrostatic drive as illustrated and described, for example, in WO 96/38710, in which strictly out-of-phase oscillator movements are achieved.

The present invention achieves the above object and others by providing a micro-mechanical rate-of-rotation sensor based on the Coriolis principle. Such sensor includes two plate-like oscillators, each formed in at least one wafer layer. The oscillators are arranged in layers one above the other in two parallel planes. An electrostatic drive is provided for simulating the oscillators to oscillate perpendicular to the planes.

Each of the two plate-like oscillators is connected by at least one spring to a couple element formed in the same wafer. The couple elements are mirror-symmetrically configured with respect to a mid-plane between the oscillators and connected to each other by a coupling web to form a couple structure for the oscillators. Such structure is arranged so that the oscillators coupled thereto can be stimulated to oscillate out-of-phase exclusively.

The preceding and other features and advantages of this invention will become further apparent from the detailed description that follows. Such description is accompanied is accompanied by a set of drawing figures in which numerals point to the features of the invention. Numerals of the written description correspond to those of the drawing figures, with like numerals referring to like features throughout both the drawing figures and the written description.

DETAILED DESCRIPTION OF THE PREFERRED EMBODIMENT

Figure 1:
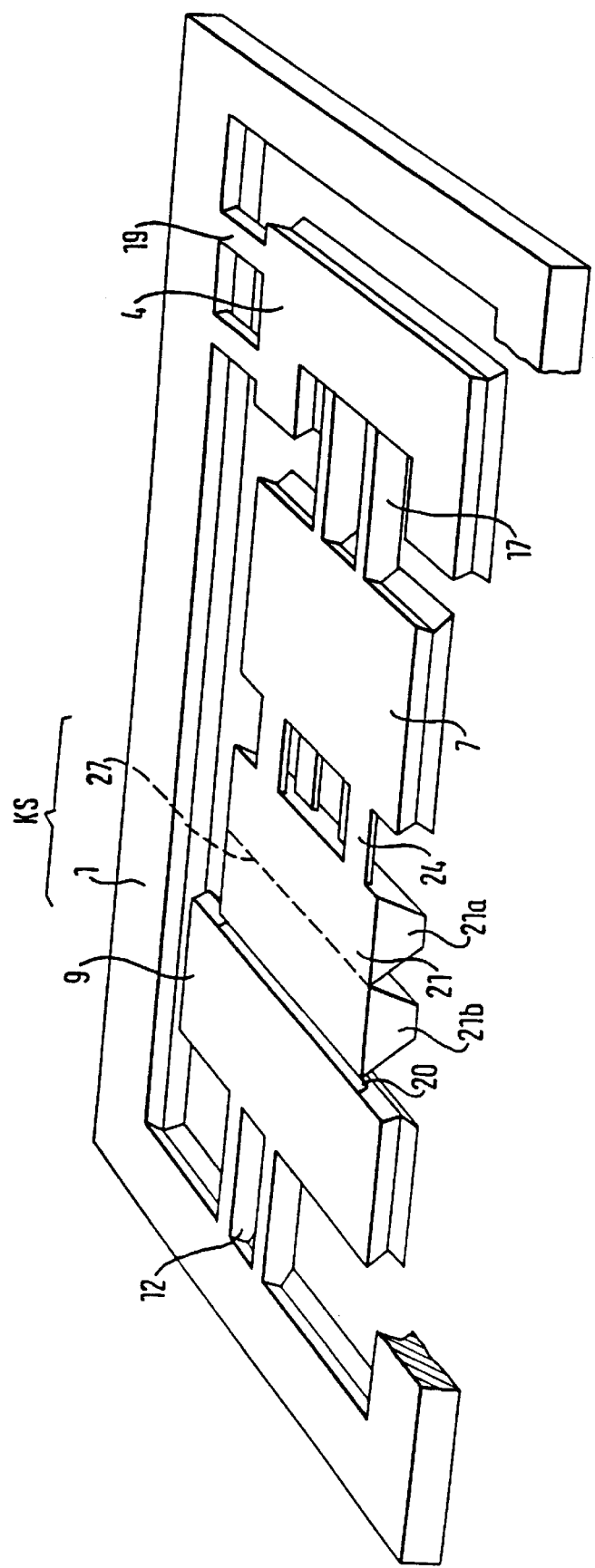
FIG. 1 is a perspective view of a first (upper) wafer layer of an oscillator arrangement of a Coriolis gyroscope for measuring rate of rotation in accordance with the invention.

FIG. 1 is a perspective view of a first (upper) wafer layer of an oscillator arrangement of a Coriolis gyroscope for measuring rate of rotation in accordance with the invention. A frame 1, produced from a single wafer, includes, from left to right, a plate-like support 9 connected via a spring articulation 12 (e.g. a crossed-spring articulation) and, for reading out rate of rotation, a couple structure that is articulated to the support by means of at least one spring 20. It is, in turn, articulated by one or more springs 24 to a plate-like oscillator 7, which, in turn, is connected via a spring (e.g. a bending spring 17) to a plate-like drive element 4. The element 4 is, in turn, held in the frame 1 by one or more bending springs 19.

The articulation of the drive element 4 within the frame can be achieved either laterally (as shown) or at an end. The springs 12 and 17, when configured as rotary or mutually-crossing spring articulations, possess already-enumerated advantages. However, otherwise-configured spring elements can be used. In the illustrated example, the mass of the oscillator 7 is articulated approximately at the center of gravity of the electrostatic drive plate 4. When oscillations are stimulated, this leads to advantageous resonance conditions as the drive does not participate in any (possible) rotational movement. Another articulation of the complete drive plate 4 at its edge, known in the prior art, is also possible. However, this is possibly advantageous in terms of optimization of the required drive power.

Figure 3:
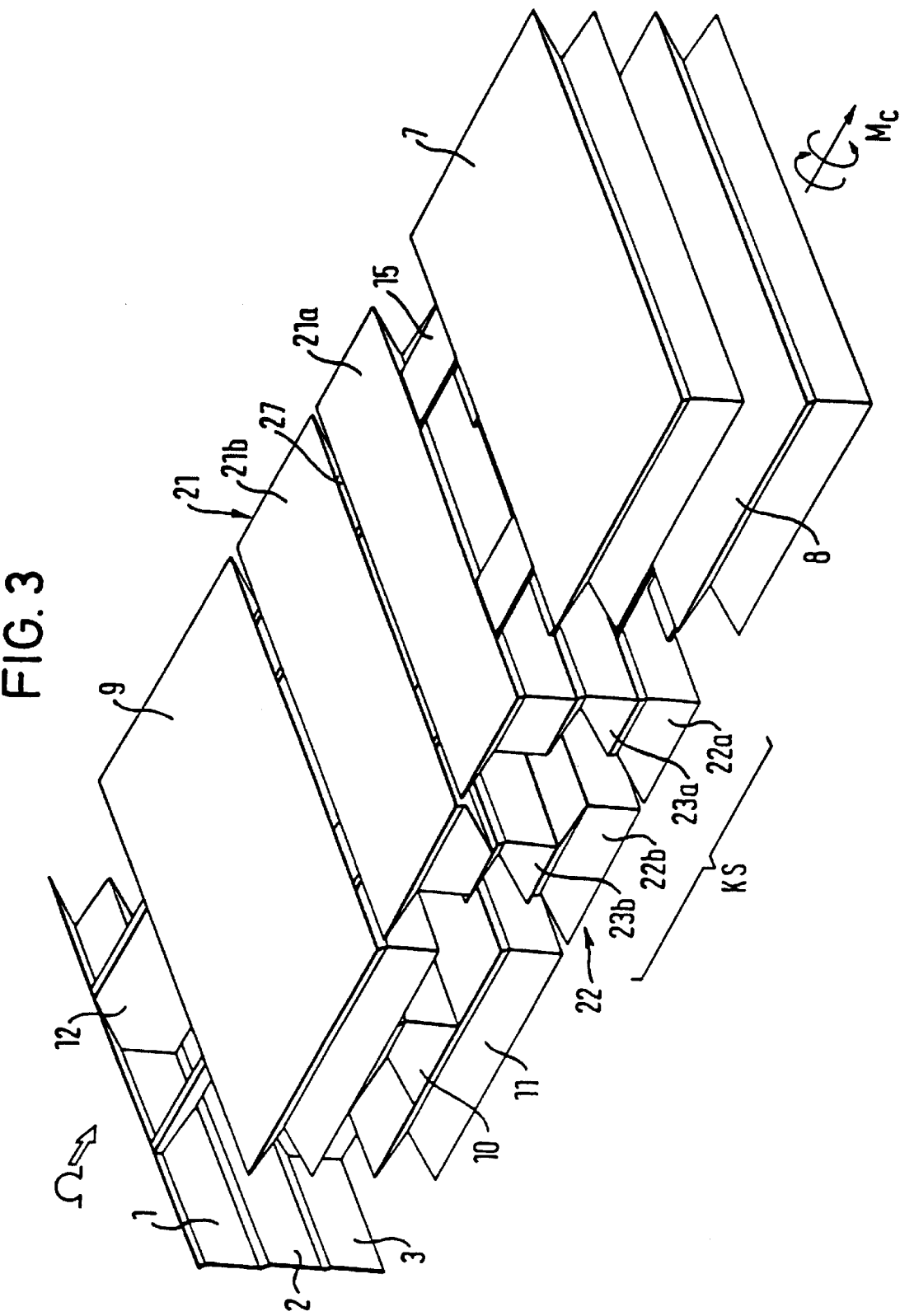
FIG. 3 is a perspective view of an oscillator arrangement within a frame (indicated schematically) with electrostatic drive removed to facilitate exposition of the essential features of the invention.
Figure 4:
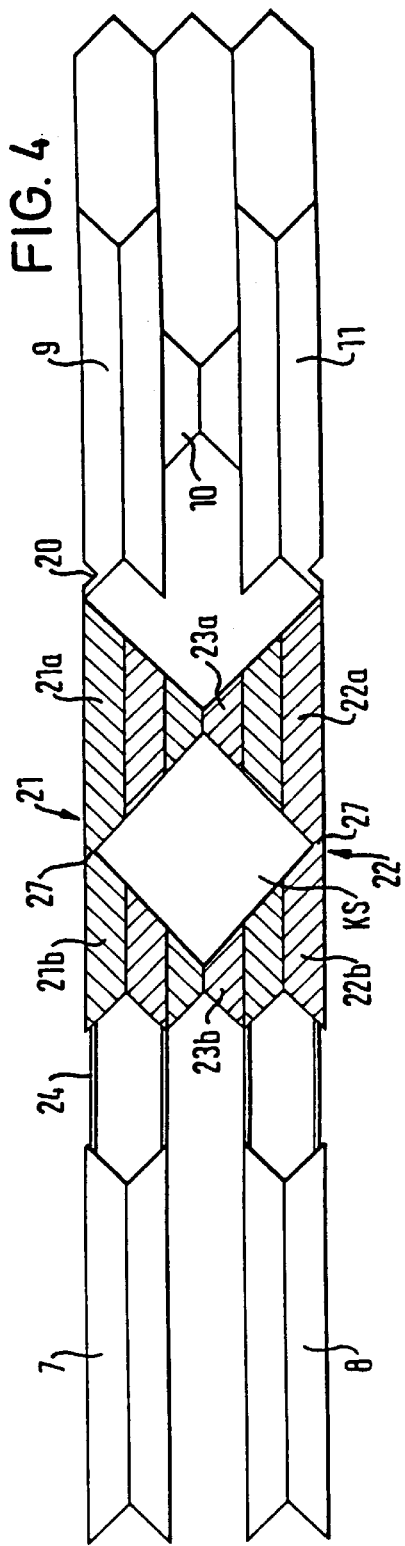
FIG. 4 is a side elevation view of the oscillator arrangement in cross-section of FIG. 3.
Figure 5:
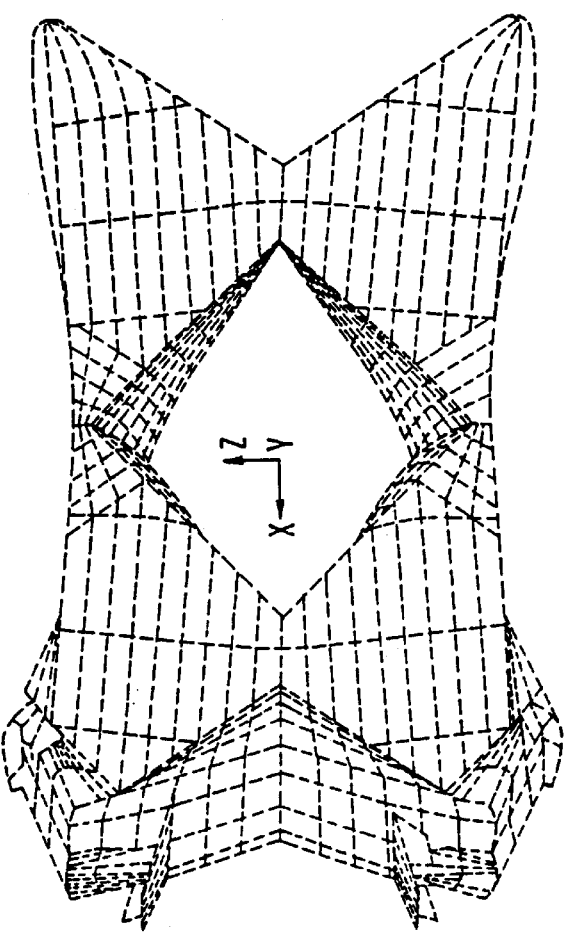
FIG. 5 is an (exaggerated) topological reproduction of the three-dimensional deformation of a couple structure within the oscillator of FIG. 3 as generated by a numerical oscillation simulation.
Figure 6:
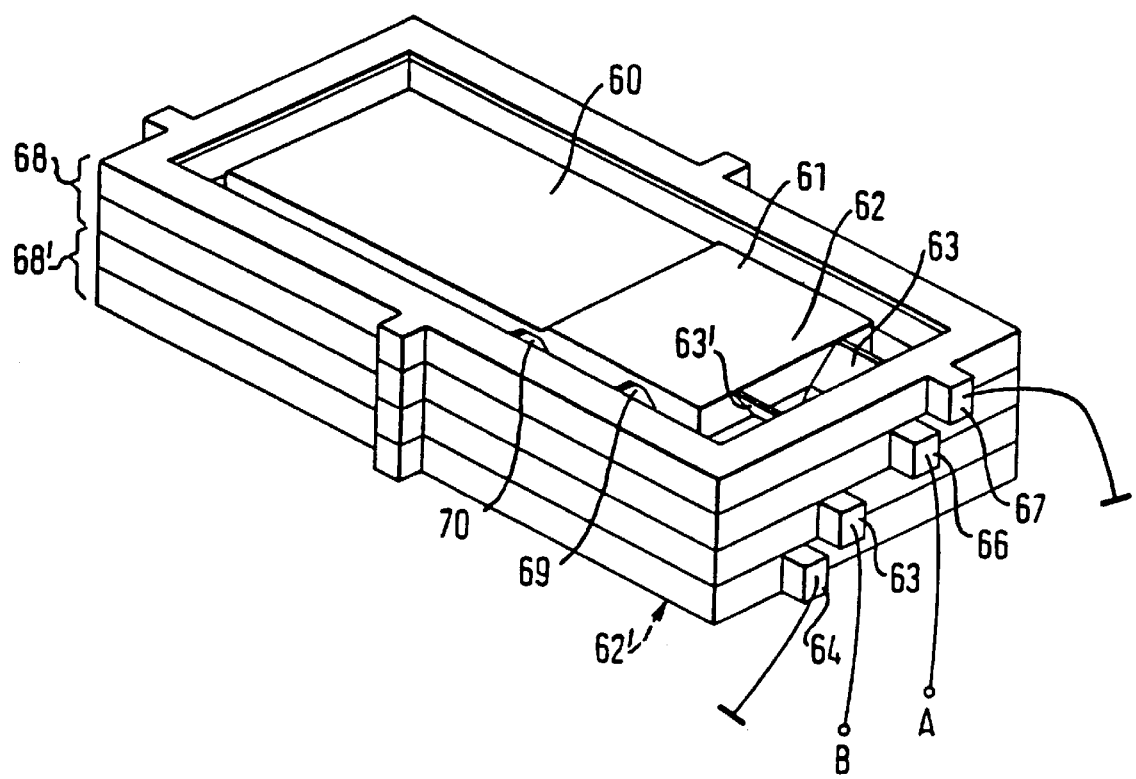
FIG. 6 is a perspective view of a micro-mechanical rate-of-rotation measuring arrangement in accordance with the prior art as exemplified by WO 96/38710.

A significant factor of the present invention is a couple structure KS (cf. FIGS. 3 and 4), by means of which stimuli to the mass of the one (upper) oscillator 7 are transmitted out-of-phase with the mass of the other (lower) oscillator 8 (of FIG. 4) and vice versa. In the upper and lower wafer layers, the couple structure KS comprises a couple element 21 which, in turn, comprises two individual elements 21a, 21b located in the wafer layer and connected to each other by at least one bending spring 27. The individual elements 21a, 21b of the couple element 21 are at right angles to the layers of the one (upper) wafer. Such elements are beveled toward the inside, mechanically connected via coupling webs 23a, 23b formed in each case in a central wafer layer, to the corresponding individual elements 22a, 22b arranged with mirror-image symmetry thereto on the other (lower) couple element 22.

Figure 2:
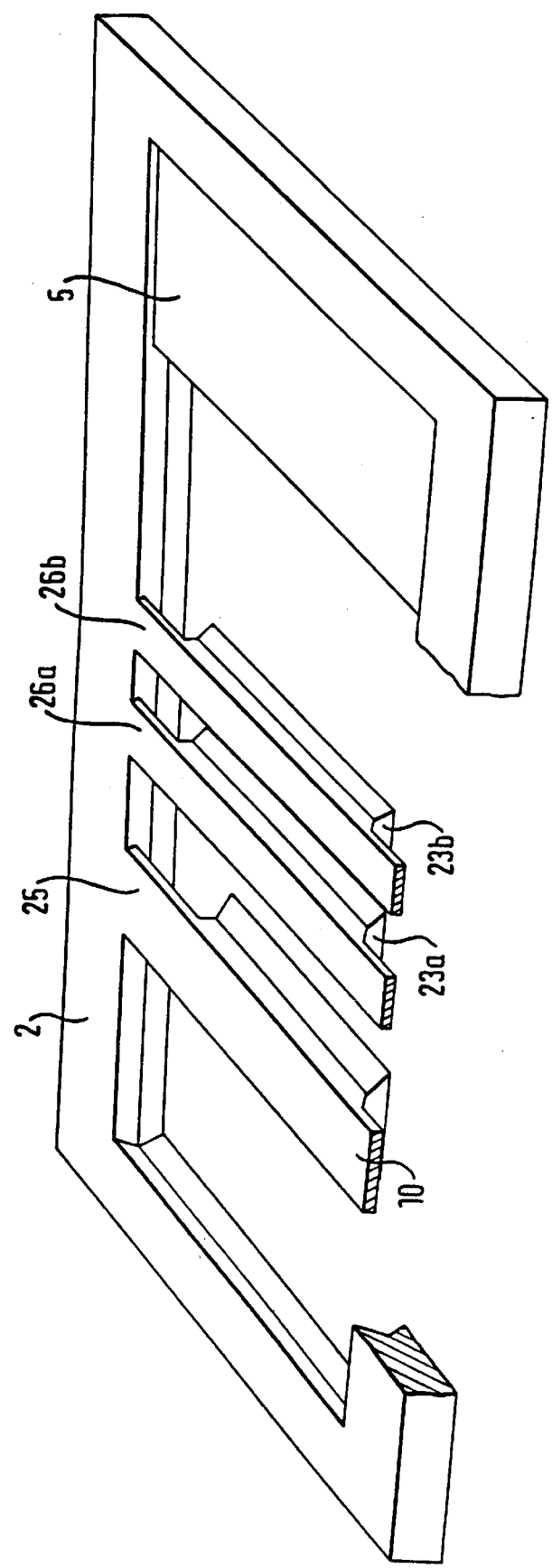
FIG. 2 is a perspective view of a central wafer (intermediate wafer layer), arranged under the upper oscillator arrangement according to FIG. 1 of a gyroscope in accordance with the invention.

FIG. 2 is a perspective view of a central wafer layer arranged under the upper oscillator arrangement of FIG. 1. The wafer has a frame 2 in which, on the right-hand side, a stationary plate drive element 5 is formed that extends the width of the frame 2 and through which electrostatic drive takes place when a drive voltage is applied. A narrow drive gap is defined in relation to the upper drive plate element 4 (or to its counterpart on the underside) on the basis of the use of a plate drive element connected in one piece to the frame 2. It can be seen from FIG. 2 that initially (i.e., before the three wafer layers are bonded) the coupling webs 23a, 23b are connected to the frame 2 via narrow springs or webs 26a and 26b respectively. Following bonding, the webs 26a, 26b, just as a web 25 that initially holds an intermediate support element 10 between the upper support 9 and the lower support 11, are severed or removed.

The particular advantages of the invention are as follows:

i) Very low gas pressures are required in the interior of the encapsulated rate-of-rotation sensor arrangement for high sensitivity as a result of the desirable narrow drive gaps between the (stationary) plate drive element 5 in the central wafer layer and the upper, mobile plate drive element 4 (or its lower counterpart). This is necessarily associated with high oscillator quality. However, especially at high oscillator quality, electronically-forced out-of-phase oscillation presents considerable difficulties in terms of circuitry and/or requires doing without adequate oscillator amplitude for higher accuracies. In the invention, strict out-of-phase behavior of the two oscillators 7, 8 is achieved with inherently-high oscillation stability.

ii) For Coriolis rate-of-rotation sensors according to the invention, it is possible to achieve very good stability of oscillator amplitudes as a result of the forced out-of-phase behavior with a high oscillator quality despite differences in oscillator masses or spring constants.

While this invention has been described with reference to its presently-preferred embodiment, it is not limited thereto. Rather, the invention is limited only insofar as it is defined by the following set of patent claims and includes within its scope all equivalents thereof.

What is claimed is:

1. A micro-mechanical rate-of-rotation sensor based on the Coriolis principle comprising, in combination:

a) two plate-like oscillators, each formed in at least one wafer layer;

b) said oscillators being arranged in layers one above another in two parallel planes;

c) an electrostatic drive for stimulating said oscillators to oscillate perpendicular to said planes;

d) said two plate-like oscillators being each connected via at least one spring to a couple element formed in the same wafer layer in each case;

e) said couple elements being mirror-symmetrically configured with respect to a mid-plane between said oscillators and connected to each other by a coupling web arranged between the couple elements to form a couple structure for said oscillators; and f) said structure being arranged so that said oscillators coupled thereby can be stimulated to oscillate exclusively out-of-phase.

2. A micro-mechanical rate-of-rotation sensor as defined in claim 1, characterized in that:

a) each couple element comprises two individual elements connected to each other via at least one bending spring; and b) said two individual elements connected in said way in an upper wafer layer and said respective individual element that is arranged mirror-symmetrically thereto in said lower wafer layer being connected to one another by, in each case, at least one coupling web formed in an intermediate wafer layer.

3. A micro-mechanical rate-of-rotation sensor as defined in claim 1, characterized in that:
 a) said couple elements are arranged inside a frame, in each case between a plate-like support to read out said rate-of-rotation signal and said associated oscillator; and
 b) said oscillator being connected, in turn, by at least one spring to an electrostatically movable drive plate.

4. A micro-mechanical rate-of-rotation sensor as defined in claim 3, characterized in that an articulation point of said spring connection between said electrostatic drive and said associated oscillator is located on the side of the respective drive plate approximately at its area center of gravity, so that said drive remains largely uninfluenced by any possible rotational movement.

* * * * *